(12) United States Patent
Leong et al.

(10) Patent No.: US 11,922,666 B2
(45) Date of Patent: Mar. 5, 2024

(54) OBJECT PRESENCE DETECTION USING RAW IMAGES

(71) Applicant: PixArt Imaging Inc., Hsin-Chu (TW)

(72) Inventors: Keen-Hun Leong, Penang (MY); Kheng Jin Ooi, Penang (MY); Yueh Mei Kim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 121 days.

(21) Appl. No.: 17/228,731

(22) Filed: Apr. 13, 2021

(65) Prior Publication Data
US 2022/0327325 A1    Oct. 13, 2022

(51) Int. Cl.
*G06V 10/00* (2022.01)
*G06V 10/145* (2022.01)
*G06V 10/50* (2022.01)
*G06V 10/75* (2022.01)

(52) U.S. Cl.
CPC .......... *G06V 10/145* (2022.01); *G06V 10/507* (2022.01); *G06V 10/751* (2022.01)

(58) Field of Classification Search
CPC .. G06V 10/751; G06V 10/145; G06V 10/507; G06V 10/60; G06V 10/28
See application file for complete search history.

(56) References Cited

U.S. PATENT DOCUMENTS

| | | | |
|---|---|---|---|
| 2017/0169306 A1* | 6/2017 | Chen | G06V 10/40 |
| 2018/0158199 A1* | 6/2018 | Wang | G06T 7/33 |
| 2019/0303697 A1* | 10/2019 | Teo | G06V 10/955 |
| 2019/0384953 A1* | 12/2019 | Xie | G06K 7/10722 |
| 2020/0111226 A1* | 4/2020 | Rakesh Nattoji Rajaram | H04N 5/445 |
| 2021/0022547 A1* | 1/2021 | Stork genannt Wersborg | A47J 31/56 |
| 2022/0277217 A1* | 9/2022 | Francis | G06F 16/587 |

FOREIGN PATENT DOCUMENTS

EP      3839908 A1 *  6/2021  ............. F21K 9/00

* cited by examiner

*Primary Examiner* — Molly Wilburn
*Assistant Examiner* — Ahmed A Nasher
(74) *Attorney, Agent, or Firm* — Winston Hsu

(57) ABSTRACT

An object detection system and method includes: an optical image sensor arranged to perform the following steps: capturing a calibration image during a calibration stage, dividing the calibration image into a plurality of quadrants, and calculating a parameter for each of the quadrants; capturing a plurality of raw images during a detection stage, dividing each image of the raw images into a plurality of quadrants, and calculating a parameter for each of the quadrants; comparing the respective parameters of each quadrant of a raw image with the respective parameters of each quadrant of the calibration image to generate a ratio value for each quadrant; and comparing the ratio value of each quadrant with a predetermined threshold. When each ratio value of specific quadrants of the quadrants is greater than the predetermined threshold, object detection is confirmed.

16 Claims, 6 Drawing Sheets

OBJECT PRESENCE DETECTION USING RAW IMAGES

BACKGROUND OF THE INVENTION

1. Field of the Invention

The invention is directed to optical image sensors, and more particularly, to optical image sensors which use captured images to perform object detection.

2. Description of the Prior Art

In standard object detection, proximity sensors, photoelectric sensors or ultrasonic sensors are used to determine the presence of an object within a certain range.

Although these sensors work well for object detection, the circuitry can be complicated and requires large power resources.

SUMMARY OF THE INVENTION

This in mind, it is an objective of the present invention to provide a system and method for object detection using captured raw images taken by an image sensor.

An object detection system and method comprises: an optical image sensor arranged to perform the following steps: capturing a calibration image during a calibration stage, dividing the calibration image into a plurality of quadrants, and calculating a parameter for each of the quadrants; capturing a plurality of raw images during a detection stage, dividing each image of the raw images into a plurality of quadrants, and calculating a parameter for each of the quadrants; comparing the respective parameters of each quadrant of a raw image with the respective parameters of each quadrant of the calibration image to generate a ratio value for each quadrant; and comparing the ratio value of each quadrant with a predetermined threshold. When each ratio value of specific quadrants of the quadrants is greater than the predetermined threshold, object detection is confirmed. The system further comprises a plurality of infrared LEDs for providing infrared illumination to the system and an IR filter positioned in front of the optical image sensor for filtering the infrared illumination. The infrared LEDs provide infrared illumination to the system when an ambient light of the system is below a particular threshold.

The parameter may be pixel intensity, a sum of pixel intensities within each quadrant, or an average of pixel intensities within each quadrant. The specific quadrants may be the central quadrants. The predetermined threshold can be adjusted according to a parameter of the calibration image, wherein the parameter is noise.

These and other objectives of the present invention will no doubt become obvious to those of ordinary skill in the art after reading the following detailed description of the preferred embodiment that is illustrated in the various figures and drawings.

DETAILED DESCRIPTION

In contrast to the prior art which uses sensors to perform object detection, the method and system of the present invention uses raw images captured by an image sensor to perform object detection. In this way, circuitry can be kept simple while still achieving the objectives of object detection.

Figure 1A:
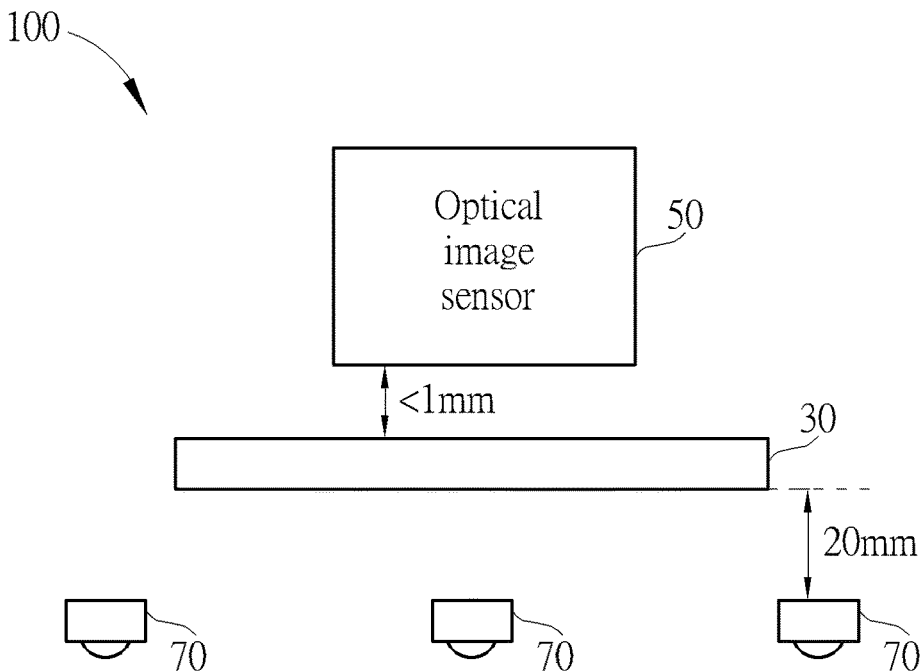
FIG. 1A is a side view of an optical image sensor system according to an exemplary embodiment of the present invention.
Figure 1B:
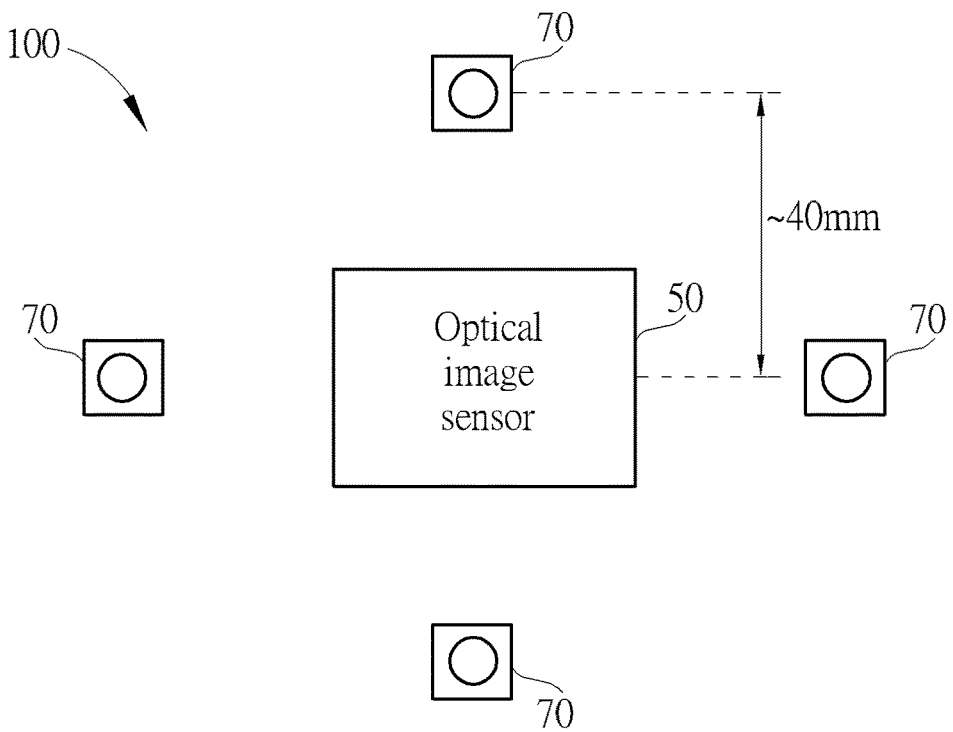
FIG. 1B is a bottom view of the optical image sensor system shown in FIG. 1A.

Refer to FIG. 1A and FIG. 1B, which show an exemplary embodiment of an image sensor system for performing object detection. FIG. 1A is a side view of an image sensor system 100, comprising an optical image sensor 50 placed in proximity to an IR filter 30 (in the diagram, the distance between the two is less than 1 mm), and a plurality of IR LEDs 70 placed around the optical image sensor 50 at a distance of approximately 20 mm from the IR filter 30.

FIG. 1B is a bottom view of the image sensor system 100, showing there are four IR LEDs 70 placed equidistant from the optical image sensor 50. As shown in the diagram, each IR LED 70 is placed at a distance of 40 mm from the optical image sensor 50.

The following description uses a coffee machine detecting the presence of a coffee cup as an example, but this is merely for best illustration of the inventive features, and the invention is not limited to this particular embodiment. The optical image sensor 50 illustrated above is used to take images for detecting whether a coffee cup is present or not. In this embodiment, the optical image sensor 50 will be positioned directly above where a coffee cup should be placed, i.e. on a flat tray below a spout of the coffee machine for distributing coffee (or other liquids).

As will be understood, it is desirable for a coffee machine to be able to detect the presence of a coffee cup, wherein if no coffee cup is present or if the coffee cup is not centred underneath the coffee machine then the coffee machine will not pour coffee. In order to perform the method of the present invention, a calibration image corresponding to a situation where no coffee cup is present will first be captured.

Figure 2:
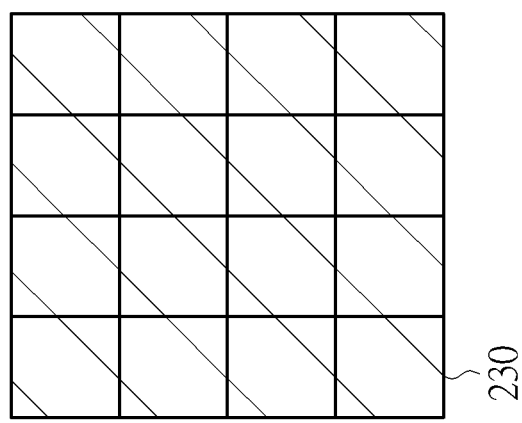
FIG. 2 illustrates a raw image where no object is present.

Refer to FIG. 2, which shows a raw image 230 captured by the optical image sensor 50 where no coffee cup is present. The raw image is divided into quadrants 270, and a parameter for each quadrant is calculated. This parameter may be any statistic such as a sum of pixel intensity values within each quadrant, or an average value of the pixel intensity values within said quadrant.

Figure 3:
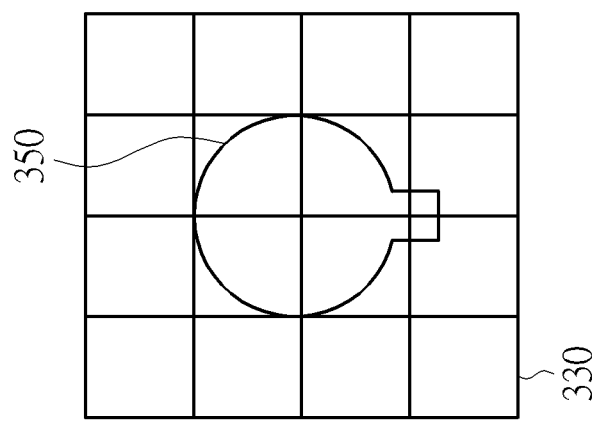
FIG. 3 illustrates a raw image containing a centred object.

The system then enters a detection stage, wherein raw images are captured by the optical image sensor 50 and used to determine whether an object is present. Refer to FIG. 3 which shows a raw image and the values of the respective quadrants when a coffee cup is placed directly under the optical image sensor 50. As shown in the diagram, a coffee cup 350 is captured in the centre of the raw image 330. As in the calibration image 230, the raw image 330 is divided into quadrants 370, and the same parameters are calculated for the quadrants 370 as for the quadrants 270. Comparing the quadrants 370 with the quadrants 270, it can be seen that the parameters are much higher in the individual quadrants corresponding to the coffee cup 350.

In order to accurately determine the presence of an object, for each raw image captured during the detection stage, the sum of values for each quadrant will be compared to the calibration raw image.

Figure 4:
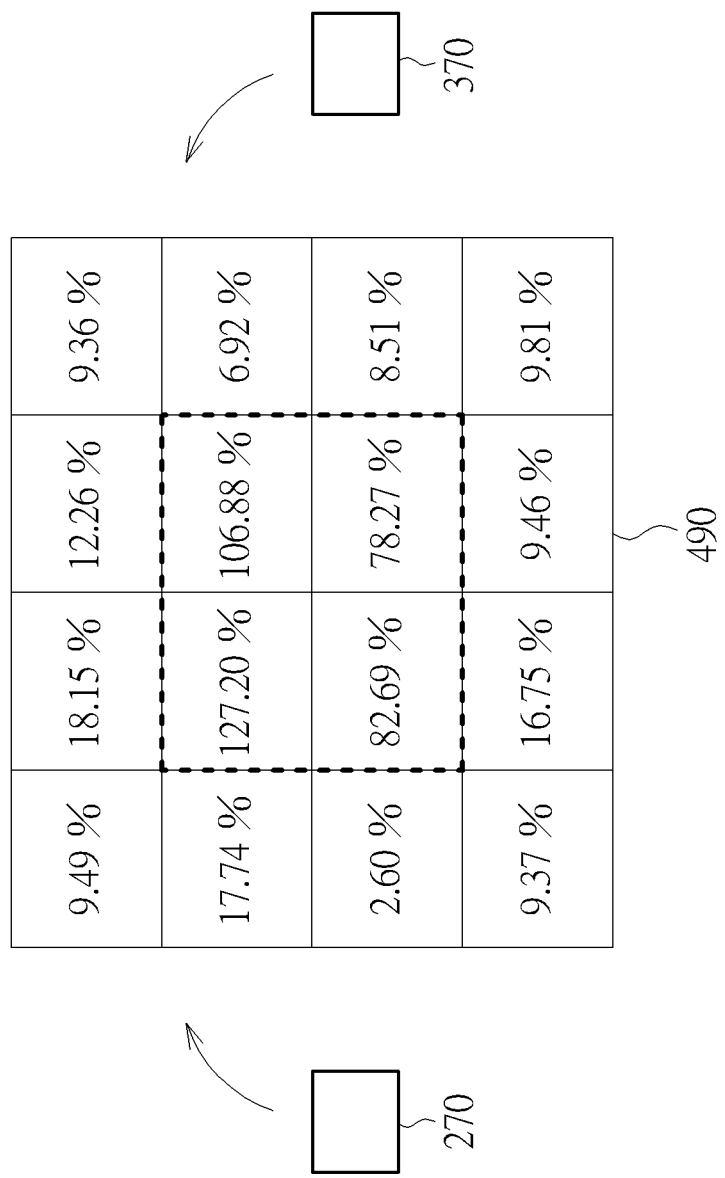
FIG. 4 illustrates a comparison of the raw images in FIG. 2 and FIG. 3.

This is illustrated in FIG. 4, which utilizes the following equation:

Ratio of quadrant=absolute(background quadrant−new quadrant)/background quadrant×100%

As shown in the quadrant ratio chart 490, the four quadrants at the centre of the image have a ratio close to or more than 100%. Using this data, it can be determined that there is an object present in the centre of the raw image 330. In an exemplary embodiment, a threshold value for determining the presence of an object is set to 20%. Please note that this threshold may be set to any value, and the particular value may depend on how much 'noise' is present in the calibration image 230. For a 'noisy' image, it is preferable to set the threshold to a higher value. The calibration stage may also be performed for a plurality of images to determine the amount of noise with greater accuracy.

Figure 5:
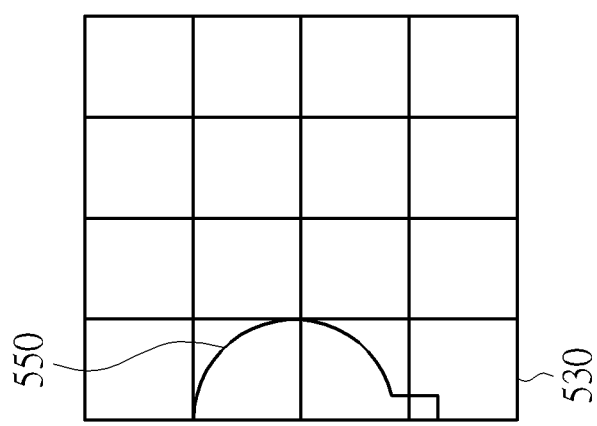
FIG. 5 illustrates a raw image containing an off-centre object.

FIG. 5 shows a raw image 530 where a coffee cup 550 is present but is not centred. Looking at the ratio quadrant image 590 for the raw image 530, it can be seen that the two middle left-hand quadrants have a percentage value close to one hundred, whereas all other quadrants have a percentage value close to zero. In this situation, if the coffee machine simply used the presence of an object in any quadrant as a determination for pouring coffee, the coffee would not be poured accurately into the coffee cup 350. The image sensor system can therefore select certain quadrants for which the threshold detection means that an object is present. Using the examples shown in FIG. 3 and FIG. 5, it would be desirable to select the central four quadrants for object detection. In this way, only when the coffee cup 350 is placed directly below the optical image sensor 50 will the coffee cup machine pour coffee. Additionally, the system can be set to only detect an object of a particular size by selecting certain quadrants corresponding to said size.

The above method depends upon a comparison between the calibration image and raw images captured during a detection stage. The value of the parameters calculated for each quadrant of a raw image will not only depend on the presence or lack of an object, but also on the ambient lighting. As will be known by those skilled in the art, an image obtained in bright conditions will be very different from an image obtained in dark conditions. Furthermore, reflectivity of the surface being photographed will also influence the raw data.

Rather than adjusting calibration and thresholds depending on the ambient environment, it is more convenient to control the environment in which the raw images are being captured. The image sensor system 100 therefore further includes the IR filter 30 and the IR LEDs 70 illustrated in FIG. 1A and FIG. 1B. By illuminating the environment with infrared light, humans will not be affected but the optical image sensor 50 can capture a more accurate raw image which does not depend on ambient lighting. Optimally, as shown in FIG. 1A, the filter will be attached very closely to the sensor's lens (preferably at a distance less than 1 mm). The IR LEDs 70 generate infrared light at a wavelength corresponding to a wavelength passed by the IR filter 30. Please note that, due to the presence of the IR filter 30 in front of the optical image sensor 50, the IR LEDs 70 must be illuminated during all operations to enable the optical image sensor 50 to capture images.

Figure 6:
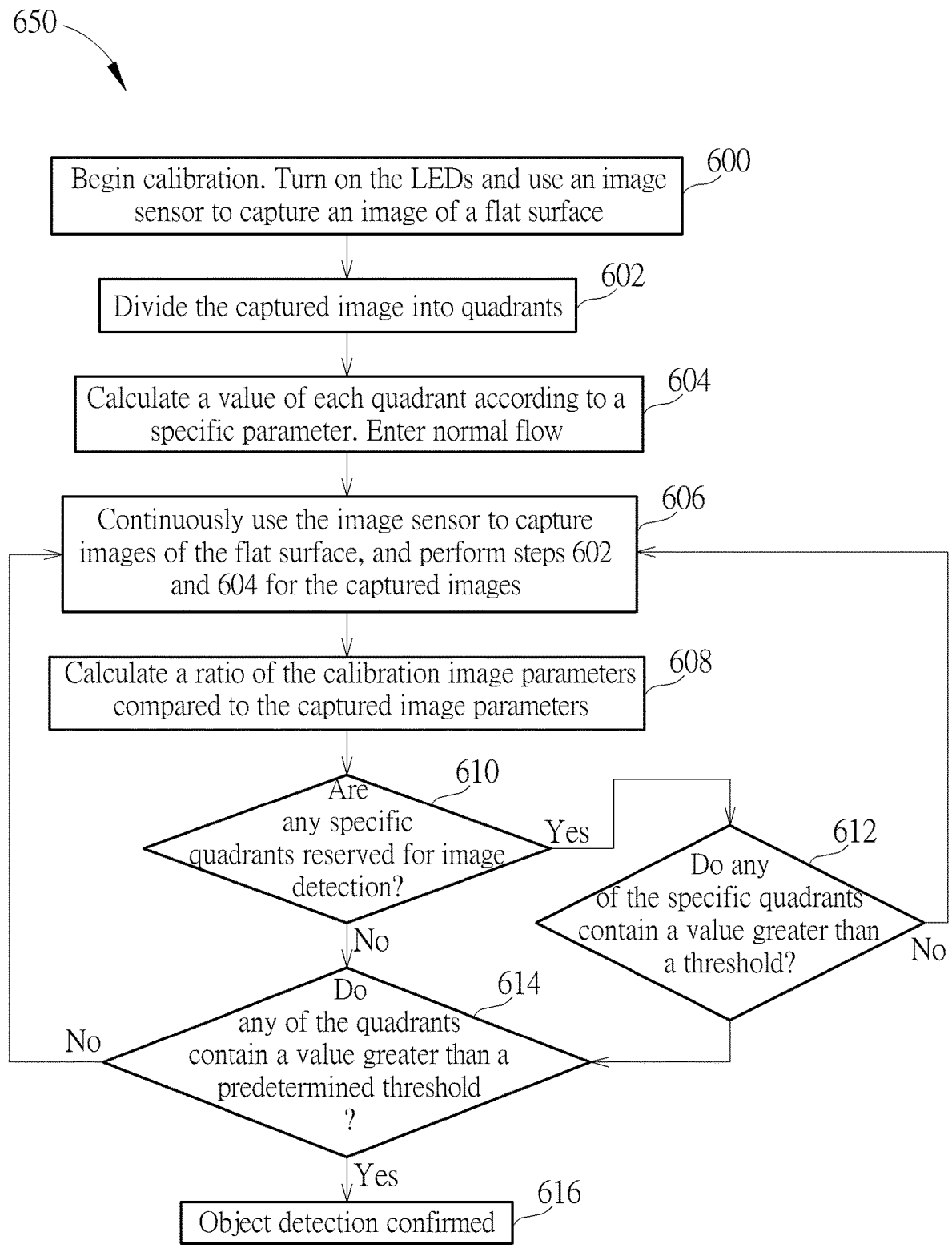
FIG. 6 is a flowchart of a method according to an exemplary embodiment of the present invention.

FIG. 6 is a flowchart of a method 650 for performing object detection using an optical image sensor according to the above described embodiments. The method comprises the following steps:

Step 600: Begin calibration. Turn on the LEDs and use an image sensor to capture an image of a flat surface;

Step 602: Divide the captured image into quadrants;

Step 604: Calculate a value of each quadrant according to a specific parameter. Enter normal flow;

Step 606: Continuously use the image sensor to capture images of the flat surface, and perform steps 602 and 604 for the captured images;

Step 608: Calculate a ratio of the calibration image parameters compared to the captured image parameters;

Step 610: Are any specific quadrants reserved for image detection? If yes, go to Step 612; if no, go to Step 614;

Step 612: Do any of the specific quadrants contain a value greater than a threshold? If yes, go to Step 614; if no, return to Step 606;

Step 614: Do any of the quadrants contain a value greater than a predetermined threshold? If yes, go to Step 616; if no, return to Step 606;

Step 616: Object detection confirmed.

The above method and system are described with reference to a coffee machine for detecting a coffee cup, but the method and system can be applied to any situation for detecting an object using an optical image sensor. By using an optical image sensor to capture images, dividing the captured images into quadrants, calculating a value of each quadrant corresponding to a particular parameter, and comparing the values of a captured image with those of a calibration image, the above system and method can accurately determine the presence of an object using an optical image sensor alone. The system and method can also set certain quadrants only to give a positive result for object detection, and can further set different thresholds and/or incorporate IR lighting to compensate for ambient lighting and changes in the local environment.

Thus, the above method and system for determining the presence of an object can yield good results without requiring large power resources or costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system in a coffee machine for performing object detection to determine presence of a coffee cup for enabling the coffee machine, the system comprising:
   a light source; and
   an optical image sensor placed directly above an area of the coffee machine where the coffee cup will be placed, the optical image sensor arranged to perform the following steps:
   selectively illuminating the area with the light source and capturing a calibration image of the area during a calibration stage, dividing the calibration image into a plurality of quadrants, and calculating a parameter for each of the quadrants, wherein there is no coffee cup in the calibration image;
   selectively illuminating the area with the light source and capturing a plurality of raw images of the area during a detection stage, dividing each image of the raw images into a plurality of quadrants, and calculating a parameter for each of the quadrants;

comparing the respective parameters of each quadrant of a raw image with the respective parameters of each quadrant of the calibration image to generate a ratio value for each quadrant; and comparing the ratio value of each quadrant with a predetermined threshold corresponding to pixel intensity;

wherein when each ratio value of specific quadrants of the quadrants is greater than the predetermined threshold, detection of the coffee cup is confirmed;

wherein the optical image sensor is contained within the coffee machine, the specific quadrants are the central quadrants, and when detection of the coffee cup is confirmed, the coffee machine is enabled to pour coffee.

2. The system of claim 1, wherein the parameter is pixel intensity.

3. The system of claim 2, wherein the parameter is a sum of pixel intensities within each quadrant.

4. The system of claim 2, wherein the parameter is an average of pixel intensities within each quadrant.

5. The system of claim 1, wherein the light source comprises a plurality of infrared LEDs for providing infrared illumination to the system, and the system further comprises:

an IR filter positioned in front of the optical image sensor for filtering the infrared illumination.

6. The system of claim 5, wherein the infrared LEDs provide infrared illumination to the system when an ambient light of the system is below a particular threshold.

7. The system of claim 1, wherein the predetermined threshold can be adjusted according to a parameter of the calibration image.

8. The system of claim 1, wherein the parameter is noise.

9. A method for determining the presence of a coffee cup in a coffee machine for enabling the coffee machine, the method comprising:

utilizing an optical image sensor placed directly above an area of the coffee machine where the coffee cup will be placed to perform the following steps:

selectively illuminating the area with a light source contained within the coffee machine and capturing a calibration image of the area during a calibration stage, dividing the calibration image into a plurality of quadrants, and calculating a parameter for each of the quadrants, wherein there is no coffee cup in the calibration image;

selectively illuminating the area with the light source and capturing a plurality of raw images of the area during a detection stage, dividing each image of the raw images into a plurality of quadrants, and calculating a parameter for each of the quadrants;

comparing the respective parameters of each quadrant of a raw image with the respective parameters of each quadrant of the calibration image to generate a ratio value for each quadrant; and comparing the ratio value of each quadrant with a predetermined threshold corresponding to pixel intensity;

wherein when each ratio value of specific quadrants of the quadrants is greater than the predetermined threshold, detection of the coffee cup is confirmed;

wherein the optical image sensor is contained within the coffee machine, the specific quadrants are the central quadrants, and when detection of the coffee cup is confirmed, the method further comprises enabling the coffee machine to pour coffee.

10. The method of claim 9, wherein the parameter is pixel intensity.

11. The method of claim 10, wherein the parameter is a sum of pixel intensities within each quadrant.

12. The method of claim 10, wherein the parameter is an average of pixel intensities within each quadrant.

13. The method of claim 9, wherein the steps of selectively illuminating the area with the light source comprise providing infrared illumination according to an ambient light; and the method further comprises:

utilizing an IR filter positioned in front of the optical image sensor to filter the infrared illumination.

14. The method of claim 13, wherein the infrared LEDs provide infrared illumination when an ambient light is below a particular threshold.

15. The method of claim 9, wherein the predetermined threshold can be adjusted according to a parameter of the calibration image.

16. The method of claim 9, wherein the parameter is noise.

* * * * *